April 2, 1929.  G. J. FITZPATRICK  1,707,789
BEATER
Filed May 8, 1924
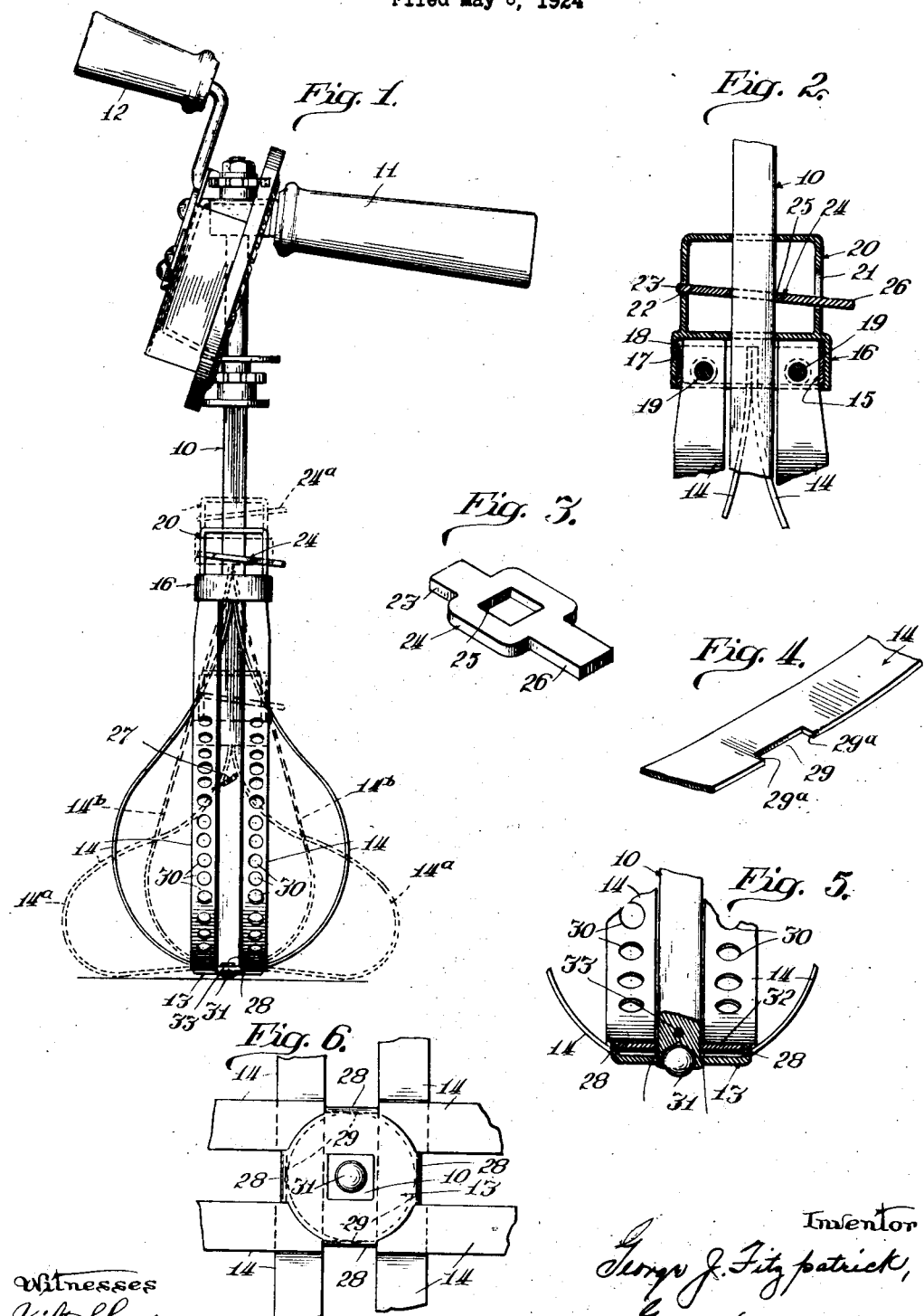

Patented Apr. 2, 1929.

1,707,789

UNITED STATES PATENT OFFICE.

GEORGE J. FITZPATRICK, OF CHICAGO, ILLINOIS.

BEATER.

Application filed May 8, 1924. Serial No. 711,810.

My invention relates to a beater to be used as an egg beater, cream whipper, and the like; and more particularly to a beater provided with a plurality of blades or beater elements which are adjustably arranged on or secured to the operating shaft so as to permit the blades to be expanded or contracted, namely a beater of the type disclosed in my Patent No. 1,417,982, dated June 3rd, 1922.

The object of my present invention is to provide means whereby the adjusted positions of the beater elements will be readily attained and said elements automatically locked in their adjusted positions relative to the operating shaft; while at the same time providing means which may be easily and quickly released from locking position.

Another object of my invention is to provide means whereby the ends of the bowed beater elements may be suitably held in place and a sanitary construction provided; while at the same time the beater elements and said means are so constructed as to permit bowing of the beater elements into extreme or maximum contracted condition without causing a fracture of said beater elements; the beater elements being apertured throughout the operating surfaces thereof to provide increased beating area and therefore a construction which will materially assist in aerating the material operated on.

Another object of my invention is to provide a beater which will not mar the vessel in which the beater is used, through contact of the thrust end of the operating shaft with said vessel, and which will not be induced to "travel" about the vessel during the beating operation.

The objects and advantages of my improvements will be more readily comprehended from the detailed description of the accompanying drawing, wherein:

Figure 1 is a side elevation of my improved beater; with the extreme expanded and contracted conditions of the beater elements shown in dotted lines.

Figure 2 is a detail sectional view of the beater element or blade locking mechanism and means for securing the ends of the blades in place.

Figure 3 is a detail perspective view of the lock member.

Figure 4 is a detail perspective view of the intermediate portion of a blade.

Figure 5 is a detail sectional view of the thrust end of the operating shaft and bowed portions of the blades.

Figure 6 is an inverted plan view of the bottom of the beater with portions broken away.

My invention relates to a beater adapted for whipping cream, eggs, batter and the like and comprises a suitable shaft or main rod 10, the upper end whereof is provided with suitable driving mechanism which is preferably of the type disclosed in my pending application, Serial No. 564,370, and therefore a specific description of said mechanism need not be entered into. The holding frame of the shaft driving mechanism is provided with a suitable handle 11 for holding the beater; while the driving mechanism is operated by means of the handle 12.

The lower end of the shaft 10 is provided with a disc or small plate 13 attached to the shaft so as to rotate therewith and this disc is adapted to constitute means for maintaining the intermediate or bowed portions of the beater elements 14 in place.

The beater elements are composed of flat strips of metal or sheet steel and arranged in pairs; with one pair disposed at right angles to the other pair; the blades of the one pair being spaced substantially 90 degrees from the blades of the other pair as shown in Figure 6. The blades of each pair are preferably spaced equal distances apart throughout the entire length of the blades, with the ends of the respective blades brought into juxtaposition and disposed through suitable slots in a flanged disc or cup member 15 which in turn is secured in an inverted cup member 16. The two members 15 and 16 are apertured for the passage of the shaft 10 but are intended to slide or move lengthwise thereof upon the exertion of proper pressure or force by the operator. The cup members 15 and 16 are secured together in any suitable manner, as for example by means of a slight burr 17 on the upper and outer cup member 16 adapted to enter a slot 18 in the inner cup member 15; and the ends of the respective blades are shown secured together within the telescoped members by means of a small pin or rivet 19 disposed therethrough.

The outer cup member 16 is shown provided with an inverted U-shaped strap or yoke 20, either formed integral with cup member 16 or rigidly secured thereto; the yoke 20 being apertured for the passage of shaft 10 so as to permit sliding movement of yoke 20 with the cup members 15 and 16 when desired. The yoke member 20 has one side or leg provided with an elongated slot 21, while the other side or leg is provided with an opening as at 22 to receive the end 23 of a gravity actuated locking member 24. The locking member 24 is more clearly shown in Figure 3, and consists of the enlarged intermediate portion provided with the aperture 25 of configuration corresponding with the cross sectional configuration of the shaft 10. One side of the main portion is provided with an extension or arm 26, which is preferably longer than the extension or arm 23 extending from the opposite side. The short arm or extension 23 is intended to be loosely held in the opening 22 of yoke 20, while the longer end or extension 26 is intended to pass through slot 21 of yoke 20 where it may be easily grasped or manipulated by the operator. By forming the arm or extension 26 of greater length than arm or extension 23, aside from enabling the extension 26 to be easily manipulated, the weight of the arm 26 causes the locking member 24 to be automatically swung, through the action of gravity, into the inclining manner shown in Figures 1 and 2, namely into a position at an angle to the axis of the shaft 10 and therefore into a position which will cause a gripping relation with the shaft; such action being also induced through the force exerted by the resilient blades which are under tension. That is to say, when the yoke member and the members 15 and 16 are forced downwardly on the shaft so as to bow the blades 14 into a distended or expanded condition, as for example shown in dotted lines at 14$^a$ in Figure 1, the resiliency of the blades tends to force the elements 15, 16 and the yoke upwardly, which, with the tilted position of locking member 24, induces the latter to maintain a gripping relation with the shaft and as a result holds the blades in the bowed position referred to. On the other hand, if the members 15, 16 and yoke 20 are drawn upwardly on shaft 10, so as to contract the beater elements into the position indicated in dotted lines at 14$^b$ in Figure 1, the resiliency of the blades tends to pull downwardly on yoke member 20 and gravity causes the locking member 24, if the beater is turned up side down, to assume the position shown in dotted lines in Figure 1 at 24$^a$, namely with the locking member tilted upwardly in gripping relation with the shaft 10.

It is clearly evident that when the beater elements are forced downwardly into the expanded condition shown at 14$^a$, these elements may be brought back to the normal condition shown in full lines by slight upward pressure on the free end 26 of locking member 24; while the beater elements may be released from their contracted condition shown in dotted lines at 14$^b$ by slight downward pressure on end 26 of locking member 24 so as to move the latter out of gripping relation with the shaft 10. The locking member will automatically hold the beater elements in the various positions intermediate of the extreme expanded or extreme contracted positions shown in dotted lines.

In order that the beater elements may not be subjected to too great a strain by forcing the upper ends downwardly too far, I prefer to provide shaft 10 at a suitable point with a stop pin or lug as at 27 in Figure 1 which will prevent the composite member 15—16 being moved down beyond a predetermined point.

The plate or disc member 13, at the lower end of the shaft, at diametrically opposite points, is preferably provided with slight upstanding lugs 28 adapted to be disposed intermediate of the parallelly disposed beater elements or blades 14. The intermediate portions of the beater elements or blades, and more particularly the blades which have their intermediate portions disposed within the intermediate portions of the two outer blades, (as viewed from the bottom of the beater) are preferably provided with a cut-out portion as at 29, see Figure 4, into which the upstanding lips or lugs 28 are disposed without, however, in actual contact with the blades at the ends of the cut-out portion, so as to permit the portions of the blades indicated at 29$^a$, 29$^a$, to be free to flex. These lips or lugs being within the cut out portions of the blades, maintain proper spaced relation of the intermediate portions of the blades. I find, however, that by slotting the two inner blades as described, the tendency of the inner blades to shear the outer blades when the beater elements are drawn into extreme contracted condition is prevented and breakage of the beater elements or blades adjacent to the lower end of the shaft is obviated, due to the resiliency of the blades at the points 29$^a$, 29$^a$.

In order to provide the beater elements with greater actuating surfaces, each of the blades is preferably provided with a plurality of openings 30 throughout what may be termed the operating surface of the blades. With the blades apertured as shown, a more rapid aeration of the ingredients is induced; the beating operation hastened and better results obtained.

In order to prevent the lower end of the beater traveling about in the vessel containing the ingredients, the lower end of shaft 10 is suitably socketed to receive the spherical member or ball 31; the socket being sufficient to receive the spherical member 31 to an extent slightly farther than half its diameter; and the metal of the shaft about the socket is then swaged or upset inwardly after the spherical member has been inserted so as to prevent withdrawal of the spherical member, while at the same time permitting the spherical member to have sufficient play to revolve in the socket; or in other words to permit the shaft to rotate on the spherical member when downward pressure on the beater is exerted to hold the bottom of the beater in firm contact with the bottom of the vessel in which the beating operation is being performed.

I find in practice that the spherical member not only prevents any marring of the vessel in which it is used, but it also prevents the beater from traveling in the vessel during operation.

The inner set of beater elements or blades, at their bowed or intermediate points, are held in place adjacent the lower end of the shaft 10 in any suitable manner, as for example by means of the disc 32 which may be held in place by means of a pin 33 disposed through the shaft, as shown in Figure 5.

My invention provides a beater which may be readily adapted to different types of vessels, whether in the nature of a bowl or a bottle; the extreme expanded or distended condition permitting proper agitation in a shallow vessel containing a comparatively small quantity of ingredients; while the contracted condition permits insertion of the beater into a bottle. The invention also provides means whereby the beater elements will be automatically locked in their adjusted positions; said means being of a nature which permits it to be easily and quickly released through the application of a very slight pressure on the free end of the locking member.

I have shown and described what I believe to be the simplest embodiment of my invention which has been described in terms employed merely as terms of description and not as terms of limitation, as structural modifications are possible and may be made without, however, departing from the spirit of my invention.

What I claim is:

1. In a device of the character described, the combination of a shaft, and resilient beater elements secured to the lower end of the shaft, said elements being adapted to exert pressure in the direction lengthwise of the shaft, with a housing apertured for passage of the shaft therethrough and provided with an opening in one side, and a plate within the housing, provided with an opening therethrough conforming to the cross-sectional configuration of the shaft and of size slightly larger than the diameter of the shaft so as to permit said plate to tilt in a direction lengthwise of the shaft, one end of the plate being tiltably secured to the housing, while the other end of the plate extends through the opening in the housing to provide a finger-grasping portion, said plate being held in gripping relation with the shaft through the action of the pressure exerted on the housing by the beater elements.

2. In a device of the character described, the combination of a shaft and resilient beater elements adapted to exert pressure, a housing apertured in its top and bottom for passage of the shaft therethrough and secured to the upper ends of the beater elements so as to move therewith and be affected by said pressure, a plate in said housing provided with an opening for passage of the shaft therethrough, said opening being slightly larger than the diameter of the shaft so as to permit the plate to tilt in a direction lengthwise of the shaft, one end of the plate being pivotally mounted on one side of the housing whereby pressure on the housing in either direction causes tilting of the plate to effect and maintain gripping relation with the shaft.

GEORGE J. FITZPATRICK.